E. FAHL.
LIQUID STORAGE APPARATUS.
APPLICATION FILED MAR. 20, 1919.
1,345,154.
Patented June 29, 1920.
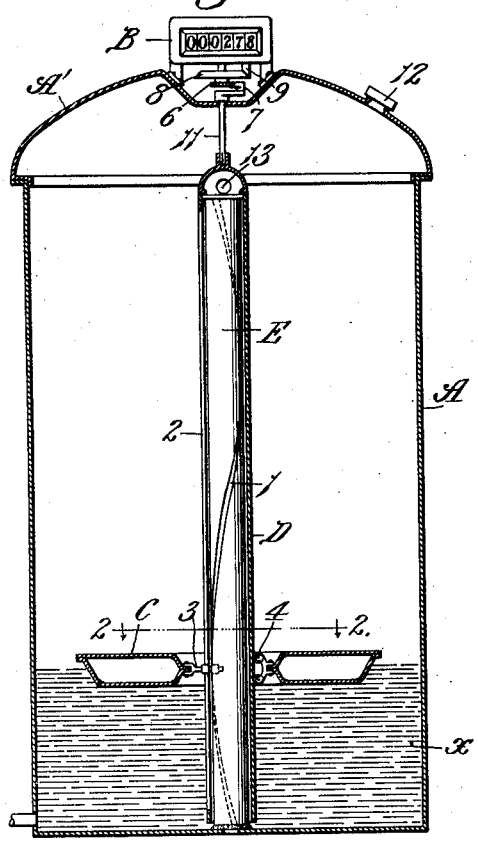
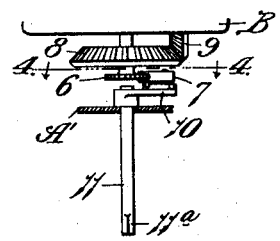
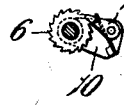
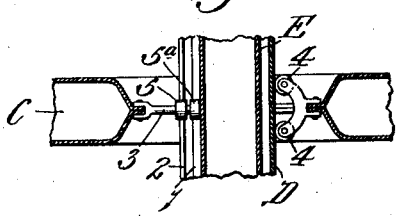
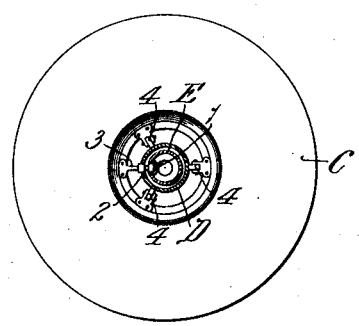
Inventor,
Eugene Fahl.
By Bakewell & Cornwall attys.

UNITED STATES PATENT OFFICE.

EUGENE FAHL, OF WICHITA, KANSAS.

LIQUID-STORAGE APPARATUS.

1,345,154.  Specification of Letters Patent.  Patented June 29, 1920.

Application filed March 20, 1919. Serial No. 283,920.

*To all whom it may concern:*

Be it known that I, EUGENE FAHL, a citizen of the United States, residing at Wichita, Kansas, have invented a certain new and useful Improvement in Liquid-Storage Apparatus, of which the following is a full, clear, and exact description, such as will enable others skilled in the art to which it appertains to make and use the same.

This invention relates to liquid storage reservoirs of the type that are equipped with a meter or register for indicating the quantity of liquid introduced into the reservoir.

The main object of my invention is to provide a liquid storage reservoir of the general type referred to whose register or meter is actuated by a float operated mechanism which is so constructed that very little power is required to operate it, thereby enabling a small float to be used.

Another object is to provide a mechanism for the purpose described which is inexpensive to manufacture and of such design that there is very little liability of its getting out of order.

Figure 1 of the drawings is a vertical sectional view of a liquid storage apparatus constructed in accordance with my invention.

Fig. 2 is a horizontal sectional view, taken on the line 2—2 of Fig. 1.

Fig. 3 is an enlarged detail view of the ratchet mechanism that permits the meter to stand at rest when the float in the reservoir descends.

Fig. 4 is a sectional view, taken on the line 4—4 of Fig. 3; and

Fig. 5 is an enlarged cross-sectional view of the float.

Referring to the drawings which illustrate the preferred form of my invention, A designates a reservoir or tank of any suitable form for holding a liquid $x$, and B designates a meter or register for indicating the quantity of liquid that is introduced into said reservoir. The register B is actuated by a float operated mechanism comprising a float C arranged inside of the reservoir and a drive member D combined with said float in such a manner that said drive member will rotate when the float C rises, due to a rise in the level of the liquid $x$ in the reservoir. A suitable means is arranged between the drive member D and the meter for causing said meter to operate when the drive member D revolves. In the form of my invention herein shown the drive member D consists of a tubular member that is rotatably mounted in any preferred manner on a stationary tube or supporting member E which projects upwardly from the bottom of the reservoir. The stationary member or upright E is provided in its outer surface with a spiral groove 1 and the drive member D is provided with a straight, vertically disposed slot 2 that extends longitudinally of same. The float C is provided with a horizontally-disposed, rigid pin 3 that projects inwardly through the slot 2 in the drive member and into the groove 1 in the stationary member E. When liquid is introduced into the reservoir A the float C rises and also revolves about the stationary member E, due, of course, to the fact that the rigid pin 3 on the float projects into the spiral groove 1 in the stationary member E. As the pin 3 on the float projects inwardly through the slot 2 in the drive member D, said drive member will revolve with the float, and thus operate the meter B. The float C is preferably provided with rollers 4 that bear against the outer side of the drive member D, and thus hold the float in concentric relation with said drive member, and the pin 3 on the float is provided with friction-reducing rollers 5 and 5ª, as shown in Fig. 5, that travel in the slots 2 and in the groove 1 respectively.

Various means can be used for transmitting movement from the drive member D to the meter B, but I prefer to use a means which is so constructed that the meter B will remain at rest when the drive member D rotates rearwardly, due to a drop in the level of the liquid $x$ and a consequent downward movement of the float C. In the form of my invention herein shown a pawl and ratchet mechanism, comprising a ratchet wheel 6 and a spring-pressed pawl 7, is arranged between the drive member D and a gear 8 that meshes with a gear 9 on the operating shaft of the meter B, the ratchet wheel 6 being rigidly connected to the gear 8, and the pawl 7 being pivotally mounted on an arm 10 secured to a shaft or extension 11 on the upper end of the drive member D. Obviously, various other means could be used for transmitting power from the drive member D to the meter B without departing from the spirit of my invention. If the reservoir A is provided with a removable cover A', as herein shown, it is preferable to mount the meter B permanently on said cover and provide the shaft 11 with a non-circular shank 11ᵃ that fits loosely in a correspondingly-shaped socket in the upper end of the drive member D, thereby enabling the cover A' to be removed easily from the reservoir without the necessity of disconnecting any fastening devices between the meter and the member that drives same. The cover of the reservoir is provided with a filling opening 12 that is normally closed by a cap, and the stationary member E is preferably used as an overflow pipe to conduct away the excess liquid that escapes through the overflow hole 13 in the upper end of the drive member when the liquid rises above a certain level.

When the reservoir is being filled the meter B will operate and register the quantity of liquid that is introduced into the reservoir, said meter being arranged in such a position that the person in charge of the reservoir or the person filling the reservoir can readily see the quantity of liquid that is introduced into the reservoir. The meter-operating mechanism is of such simple design that it can be manufactured cheaply and is not liable to get out of order, but the chief advantage of such a mechanism is that a small float can be used for operating the drive member D, due, principally, to the fact that the float C rotates as it rises, and thus produces the same effect on the drive member D that a fly wheel produces on a drive shaft.

Having thus described my invention, what I claim and desire to secure by Letters Patent, is:

1. An apparatus for holding liquid, comprising a reservoir, an indicating device, a stationary member in said reservoir provided with a spiral groove, a tubular drive member surrounding said stationary member and provided with a straight slot that extends longitudinally of same, a connection between said drive member and indicating device, and a float in said reservoir provided with a rigid portion that passes through said slot and projects into said groove, whereby said float will revolve when it rises and falls.

2. An apparatus for holding liquid, comprising a reservoir provided with a removable cover, a meter or register mounted on said cover, a driving means for said meter comprising a part carried by said cover and a drive member rotatably mounted in the reservoir and connected to said part in such a manner that it will be automatically disconnected from said part when the cover is removed, a float in said reservoir, and means for causing said float to revolve and impart rotary movement to said drive member when liquid is introduced into the reservoir.

3. An apparatus for holding liquid, comprising a reservoir provided with a removable cover, a meter or register mounted on said cover, a driving means for said meter comprising a part carried by said cover and a drive member rotatably mounted in the reservoir and connected with said part in such a manner that it will be automatically disconnected therefrom when the cover is removed, a float in said reservoir, a rigid device on said float that projects through an elongated slot on said drive member, a stationary member arranged inside of said drive member and provided with a spiral groove that receives the rigid device on the float and thus causes the float to revolve when it rises and falls, and a pawl and ratchet mechanism arranged in such a manner that the meter can remain at rest when said float and drive member revolve in one direction.

EUGENE FAHL.